United States Patent
Osmanow et al.

(10) Patent No.: US 6,456,643 B1
(45) Date of Patent: Sep. 24, 2002

(54) SURFACE PREIONIZATION FOR GAS LASERS

(75) Inventors: Rustem Osmanow, Rosdorf (DE); Uwe Stamm, Göttingen (DE)

(73) Assignee: Lambda Physik AG, Goettingen (DE)

(*) Notice: Subject to any disclaimer, the term of this patent is extended or adjusted under 35 U.S.C. 154(b) by 0 days.

(21) Appl. No.: 09/532,276

(22) Filed: Mar. 21, 2000

Related U.S. Application Data

(60) Provisional application No. 60/127,237, filed on Mar. 31, 1999.

(51) Int. Cl.[7] .................................. H01S 3/097
(52) U.S. Cl. ....................... 372/86; 372/81; 372/82; 372/83; 372/87; 372/88
(58) Field of Search ........................ 372/86, 87, 88, 372/81, 82, 83

(56) References Cited

U.S. PATENT DOCUMENTS

| | | | |
|---|---|---|---|
| 4,105,952 A | 8/1978 | Tulip .................... | 331/94.5 PE |
| 4,240,044 A | 12/1980 | Fahlen et al. .............. | 331/94.5 |
| 4,287,483 A | 9/1981 | Rudko et al. ......... | 331/94.5 PE |
| 4,365,337 A | 12/1982 | Cirkel et al. .................. | 372/87 |
| 4,380,079 A | 4/1983 | Cohn et al. .................... | 372/87 |
| 4,429,392 A | 1/1984 | Yoshida et al. ................ | 372/9 |
| 4,491,949 A | 1/1985 | Beck et al. .................... | 372/86 |
| 4,498,183 A | 2/1985 | Levatter ....................... | 372/86 |
| 4,613,971 A | 9/1986 | Brumme et al. ............... | 372/87 |
| 4,679,203 A | 7/1987 | Taylor et al. ................. | 372/86 |
| 4,718,072 A | 1/1988 | Marchetti et al. ............. | 372/86 |
| 4,719,637 A | 1/1988 | Cavaioli et al. .............. | 372/59 |
| 4,823,354 A | 4/1989 | Znotins et al. ................ | 372/59 |
| 4,953,174 A | 8/1990 | Eldridge et al. .............. | 372/87 |
| 5,042,047 A | 8/1991 | Ono et al. ..................... | 372/86 |

(List continued on next page.)

FOREIGN PATENT DOCUMENTS

| | | | |
|---|---|---|---|
| DE | 2050490 | 4/1972 | ............ D01H/1/10 |
| DE | 29 32 781 | 2/1981 | ............ H01S/3/97 |
| DE | 30 35730 A1 | 5/1982 | ............ H01S/3/03 |
| DE | 3313811 | 10/1984 | ............ H01S/3/97 |
| DE | 29521572 U1 | 11/1997 | ............ H01S/3/38 |
| EP | 0 532 751 A1 | 3/1993 | ............ H01S/3/38 |
| EP | 0 426 993 B1 | 12/1993 | ............ H01S/3/38 |
| EP | 1 075 059 A1 | 2/2001 | ........... H01S/3/971 |
| EP | 1 107 401 A1 | 6/2001 | ............ H01S/3/38 |
| JP | 63-86593 | 4/1988 | ........... H01S/3/134 |
| JP | 3-9582 | 1/1991 | ............ H01S/3/38 |

OTHER PUBLICATIONS

Lambda Physik Booklet: "Instruction for Mounting the Brewster's Window EMG 67 or Unstable Resonator Kit EMG 70," printed 1/82, 27 pages.

(List continued on next page.)

*Primary Examiner*—Paul Ip
*Assistant Examiner*—Armando Rodriguez
(74) *Attorney, Agent, or Firm*—Sierra Patent Group, Ltd.; Andrew V. Smith

(57) ABSTRACT

An excimer or molecular fluorine laser includes one or more sliding surface discharge preionization units each including an elongated preionization electrode spaced from one or more associated preionization electrodes by an elongated dielectric within the discharge chamber. The dielectric includes a sliding discharge surface at a long axis, or side, surface of its cross-section substantially facing the discharge volume of the laser. A portion of each of the elongated and associated preionization electrodes conductively contacts a surface of the dielectric portion preferably at a cross-sectional short axis, or top or bottom, side of the dielectric. A significant area of the surface of at least one, and preferably both, of the elongated and associated electrodes contacts the corresponding surface of the dielectric such that the contact area is substantially larger than the area of the sliding discharge surface. Moreover, the sliding surface is preferably oriented and positioned such that generated UV radiation illuminates the laser gas at a substantially central location of the discharge volume.

54 Claims, 4 Drawing Sheets

U.S. PATENT DOCUMENTS

| | | | |
|---|---|---|---|
| 5,048,045 A | * 9/1991 | Noda et al. | 372/86 |
| 5,081,638 A | 1/1992 | Gallant et al. | 372/86 |
| 5,090,020 A | 2/1992 | Bedwell | 372/59 |
| 5,138,622 A | 8/1992 | Friede et al. | 372/38 |
| 5,138,627 A | 8/1992 | Friede et al. | 372/86 |
| 5,142,166 A | 8/1992 | Birx | 307/419 |
| 5,187,716 A | 2/1993 | Haruta et al. | 372/57 |
| 5,225,884 A | 7/1993 | Stark et al. | 356/73 |
| 5,247,391 A | 9/1993 | Gormley | 359/601 |
| 5,247,531 A | * 9/1993 | Muller-Horsche | 372/38 |
| 5,247,534 A | 9/1993 | Muller-Horsche | 372/58 |
| 5,267,253 A | 11/1993 | Nakatani | 372/38 |
| 5,305,339 A | 4/1994 | Nakatani et al. | 372/38 |
| 5,337,330 A | 8/1994 | Larson | 372/86 |
| 5,347,531 A | 9/1994 | Nakatani et al. | 372/86 |
| 5,708,676 A | 1/1998 | Minamitani et al. | 372/86 |
| 5,818,865 A | 10/1998 | Watson et al. | 372/86 |
| 5,852,621 A | 12/1998 | Sandstrom | 372/65 |
| 5,875,207 A | 2/1999 | Osmanow | 372/86 |
| 5,897,847 A | 4/1999 | Jursich et al. | 423/219 |
| 5,923,693 A | 7/1999 | Ohmi et al. | 372/57 |
| 5,970,082 A | 10/1999 | Ershov | 372/102 |
| 5,991,324 A | 11/1999 | Knowles et al. | 372/57 |
| 6,005,880 A | 12/1999 | Basting et al. | 372/38 |
| 6,021,150 A | 2/2000 | Partio et al. | 372/57 |
| 6,023,486 A | 2/2000 | Hofmann et al. | 372/58 |
| 6,026,103 A | 2/2000 | Oliver et al. | 372/37 |
| 6,028,872 A | 2/2000 | Parlto et al. | 372/38 |
| 6,028,880 A | 2/2000 | Carlesi ete al. | 372/58 |
| 6,034,978 A | 3/2000 | Ujazdowski et al. | 372/34 |
| 6,034,984 A | 3/2000 | Hofmann et al. | 372/58 |
| 6,240,110 B1 | 5/2001 | Ershov | 372/20 |

OTHER PUBLICATIONS

K. Hohla et al., "CIF and $F_2$: two new ultra–violet laser systems," *Optics and Laser Technology*, vol. 11, No. 6, Dec. 1979, pp. 305–310.

A.S. Bashkin et al., "High–power 1 μsec ultraviolet radiation source for pumping of gas lasers," *Sov. J. Quantum Electron.*, vol. 6, No. 8, Aug. 1976, pp. 994–996.

R.S. Taylor et al., "Pre–preionization of a long optical pulse magnetic–spiker sustainer XeCl laser," *Rev. Sci. Instrum.* 65 (12), Dec. 1994, pp. 3621–3627.

R. Marchetti et al., "A new type of corona–discharge photoionization source for gas lasers," *J. Appl. Phys.*, 56 (11), Dec. 1984, pp. 3163–3168.

Tatsuo Enami et al., "High spectral purity and high durability kHzKrF excimer laser with advanced RF pre–ionization discharge," *Proceedings of SPIE*, vol. 3334, 1998.

Article in Russian language, *Journal of Technical Physics*, vol. 49, No. 6, pp. 1241–1244.

* cited by examiner

SURFACE PREIONIZATION FOR GAS LASERS

PRIORITY

This application claims the benefit of priority to U.S. provisional patent application No. 60/127,237, filed Mar. 31, 1999, which application is hereby incorporated by reference.

BACKGROUND OF THE INVENTION

1. Field of the Invention

The present invention relates to a sliding surface discharge preionization device, and method for gas discharge lasers, and particularly to a high capacitance sliding surface discharge that uniformly illuminates the discharge area and strongly preionizes the laser gas therein.

2. Discussion of the Related Art

Excimer lasers for industrial applications such as microlithography, TFT annealing, micromachining or flat panel display manufacturing, among others, must provide an output beam with high energy stability. Energy stability improvements in excimer lasers have been made by using laser beam parameter feedback algorithms for computer-controlling the laser gas composition and the driving discharge voltage (see U.S. patent applications Ser. Nos. 09/379,034, 09/447,882, 09/418,052, 09/484,818, 60/137,907, 60/160,126, 60/159,525, 60/171,717, each of which is assigned to the same assignee as the present application, and U.S. Pat. Nos. 6,014,398, 6,005,879, 5,710,787, 5,463,650 and 6,008,497, all of which are hereby incorporated by reference). Improvements in discharge chamber design have improved the flow uniformity of the laser gas through the discharge area further improving the energy stability (see U.S. patent application Ser. No. 09/453,670, assigned to the same assignee as the present application and hereby incorporated by reference).

The energy stability of the excimer laser is also strongly influenced by the strength and uniformity of the preionization of the laser gas within the discharge volume. The "preionization" of the laser gas corresponds to the initial electron concentration in the discharge volume at the initial stage of the discharge sequence. There have been developed several preionization devices and methods for generating short wavelength UV radiation that interacts with the laser gas in the discharge volume. Among the various preionization techniques are sliding surface discharge (see DE 29521572 and U.S. Pat. Nos. 5,081,638 and 5,875,207, each of which is hereby incorporated by reference), corona discharge (see U.S. patent applications Ser. Nos. 09/247,887 and 60/162,845, and U.S. Pat. No. 5,247,531, each of which is assigned to the same assignee as the present application, and DE 3035730, 3313811, 2932781, and 2050490, all of which are hereby incorporated by reference), and spark discharge between a number of pin electrodes (preionization gap) either in series arrangement (see U.S. Pat. No. 4,105,952, hereby incorporated by reference) or in parallel (see U.S. Pat. No. 4,287,483, hereby incorporated by reference) to the main discharge (see also U.S. Pat. Nos. 4,980,894, 4,951,295, 4,797,888, 5,347,532, each of which is assigned to the same assignee and is hereby incorporated by reference).

The sliding surface discharge according to DE 29521572 and U.S. Pat. No. 5,875,207 is an efficient and promising method for the preionization of the excimer laser gas medium. It is a type of discharge at the surface of a dielectric medium. The surface discharge guarantees radiation in the UV and VUV spectral range down to a wavelength of $\lambda=2$ nm at a plasma temperature in the discharge of up to $3\times10^{4\circ}$ K. (see also Bagen B., Arbeitsbr. Ins. Plasma Phys., Julisch 1963, pp. 631–34, hereby incorporated by reference).

The '638 patent, mentioned above and illustrated at FIG. 1a, describes a sliding surface discharge preionization arrangement 1a wherein insulating material 2a is positioned between preionization pins 4a to bridge the gap between the pins 4a. The insulating material 2a provides a "tracking surface" 6a for a preionization discharge. Similarly, the '638 patent, mentioned above and illustrated at FIG. 1a, describes a sliding surface discharge preionization arrangement 1b wherein insulating material 2b is positioned between preionization pins 4b to bridge the gap between the pins 4b. The insulating material 2b provides a "tracking surface" 6b for a preionization discharge.

The main advantage of the arrangement according to the '638 patent is the minimization of wear on the electrode pins 4a of FIG. 1a and the pins 4b of FIG. 1b, which is typically a problem with conventional spark gap preionizer arrangements. The voltage needed to drive a sliding surface discharge is less than that needed for dielectric breakdown of the gas between the pins 4a of FIG. 1a and the pins 4b of FIG. 1b. An additional advantage is that significant output laser parameters are more stable for excimer and molecular fluorine lasers having sliding surface discharge preionizers than those having spark preionizers. For example, the use of sliding surface discharge pre-ionization arrangements typically provides better pulse-to-pulse energy stabilities as well as a longer dynamic gas lifetimes for excimer and molecular fluorine lasers.

A disadvantage of the arrangements shown at FIGS. 1a and 1b of the '638 patent is the directional characteristics of the UV light generated by the sliding discharge preionization. While spark-type pre-ionization arrangements with pin electrodes produce characteristically cylindrical radiation patterns, the UV emission from the sliding surface discharge preionization arrangements of FIGS. 1a and 1b is directed away from the insulating tracker surface. This results in a periodic preionization intensity distribution along the elongated direction of the discharge volume.

In addition, the sparks pins 4a of FIG. 1a and the pins 4b of FIG. 1b of the preionization arrangements are described in the '638 patent as being located nearer the high voltage main electrode than the grounded main electrode (the main electrodes are not shown in FIGS. 1a and 1b), the UV emission from the tracker surface 6a of FIG. 1a and the tracker surface 6b of FIG. 1b more strongly illuminates the portion of the laser gas in the discharge volume that is nearer the high voltage electrode than the grounded electrode. Thus, the laser gas in the discharge volume is not uniformly illuminated. In addition, due to the pin-type structure of the pins 4a of FIG. 1a and the contact shape of the electrodes 4b of FIG. 1b, the energy coupling into the surface discharge is somewhat inefficient.

SUMMARY OF THE INVENTION

It is therefore an object of the invention to provide an efficient sliding surface preionization arrangement for an excimer or molecular fluorine laser.

It is further object of the invention to provide a sliding surface preionization arrangement wherein the laser gas filling the discharge volume of the excimer or molecular fluorine laser is uniformly illuminated with UV light generated by the sliding surface discharge.

In accordance with the above objects, an excimer or molecular fluorine laser is provided with a sliding surface discharge preionization arrangement for efficiently generating UV light that uniformly illuminates the laser gas located within the discharge volume. The preionization arrangement includes one or more preionization units including an elongated electrode and a plurality of pin electrodes, wherein an elongated insulating dielectric is disposed between the elongated electrode and each of the pin electrodes. The elongated electrode and the pin electrodes preferably contact opposed surfaces of the dielectric, such as may be defined as "top" and "bottom" surfaces of the elongated dielectric.

At least a portion of the insulating dielectric includes a sliding discharge surface at a long axis, or "side", edge of its cross-section substantially facing the discharge volume of the laser. A portion of each of the elongated preionization electrode and the pin electrodes conductively contacts one of the cross-sectional short axis, or top and bottom, surfaces of the dielectric portion.

Preferably, the portion of the elongated electrode that contacts the dielectric is also a short-axis surface of the electrode. In addition, a significant area of the surface of at least one of the electrodes contacts the corresponding surface of the dielectric such that preferably the contact area is substantially larger than the area of the sliding discharge surface. Moreover, the sliding surface is preferably oriented and positioned at a location with respect to the discharge volume to direct the UV light at the discharge volume such as to optimize the uniformity of illumination of the laser gas therein.

The preionization arrangement of the present invention thus has an advantageous elongated dielectric including a surface for generating a sliding discharge, and strong capacitive coupling, such as around 0.1 pF or more, of the conducting electrodes to the insulating material creating high preionization of the laser gas in the discharge volume. Multiple sliding surfaces of the preionization arrangement of the present invention advantageously extend between the elongated electrode and each of the pin electrodes and are designed to irradiate efficiently the volume of the main discharge of the excimer or molecular fluorine laser.

BRIEF DESCRIPTION OF THE DRAWINGS

FIG. 2b schematically shows an enlarged view of one unit of the sliding surface preionization arrangement of FIG. 2a.

FIG. 3b schematically shows an enlarged view of one unit of the sliding surface preionization arrangement of FIG. 3a.

FIG. 4b schematically shows an enlarged view of one unit of the sliding surface preionization arrangement of FIG. 4a.

DETAILED DESCRIPTION OF THE PREFERRED EMBODIMENT

Figure 2A:
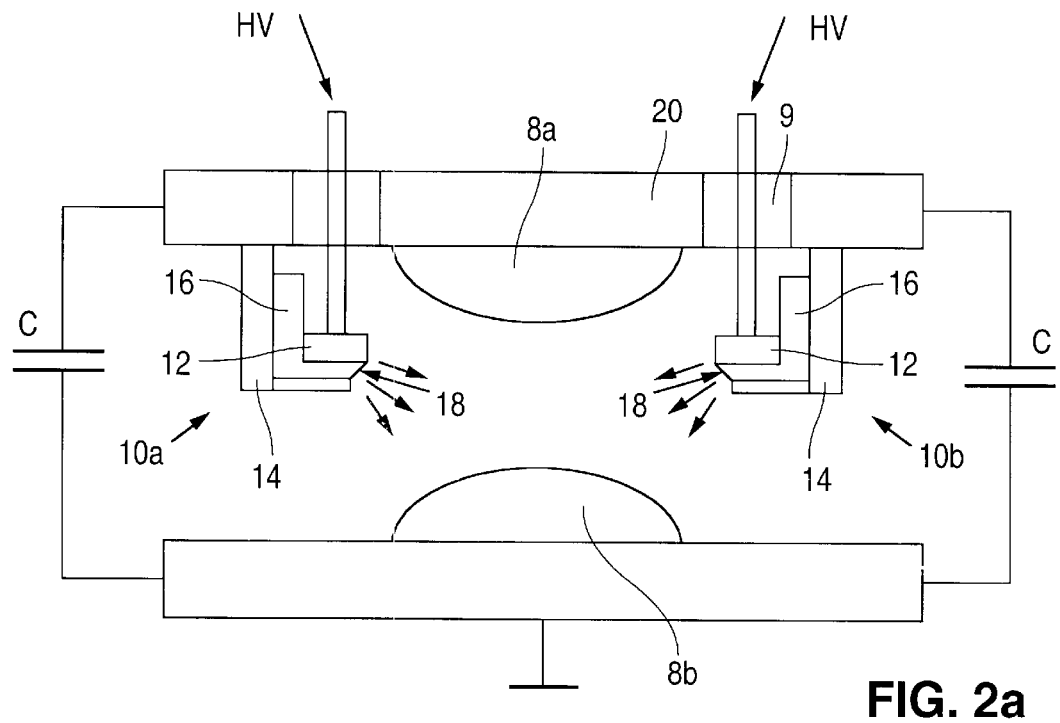
FIG. 2a schematically shows a discharge chamber for an excimer or molecular fluorine laser including a sliding surface preionization arrangement in accord with a first embodiment of the present invention.

FIG. 2a schematically shows a cross-sectional view of a discharge chamber of an excimer or molecular fluorine laser in accord with a first preferred embodiment. The laser may be a rare gas halogen excimer laser such as a KrF, ArF, KrCl, XeCl or XeF laser, or a $F_2$ laser. The laser includes a pair of elongated main electrodes 8a and 8b. The electrodes are "elongated" in a direction normal to the plane of the paper that includes the cross sectional view of FIG. 2a, and the term "elongated" is to be so construed wherever it appears herein, including in the claims.

The laser also includes a sliding surface preionization arrangement in accord with a first embodiment of the present invention. The preionization arrangement includes a pair of sliding surface preionization units 10a, 10b. Alternatively, the laser may have only a single preionization unit 10a or 10b. In this alternative arrangement, it is preferred that the laser include the preionization unit 10a and not the preionization unit 10b, such that the single preionization unit is located on the upstream side of the discharge volume. Each preionization unit 10a, 10b shown in FIG. 2a includes at least one and preferably several high voltage (HV) pin electrodes 12 and an elongated grounded or low voltage electrode 14 separated by an elongated insulating dielectric 16. The insulating dielectric includes a sliding surface 18 between each pin electrode 12 and the elongated electrode 14. Electrode 12 is isolated from the metal plate carrying the main electrode 8a by a high voltage feedthrough 9.

The elongated electrode 14 is manufactured in one piece, and has an elongated length that is preferably approximately the length of the active laser gas volume. The pin electrodes 12 are preferably spaced apart from each other in the elongated direction of the elongated electrode by 10 mm or more. The extent of the pin electrodes 12 in the elongated direction of the discharge chamber is preferably in a range between 3 and 30 mm. The dielectric insulator 16 is preferably a ceramic such as, $Al_2O_3$, $BaTiO_3$, $BaTiO_3/ZrO2_2$, $BaTiO3_3/SrTiO3_3$, $ZrO2_2$, or sapphire. The insulator 16 may be manufactured from one piece or several pieces. The length of the insulating dielectric 16 is preferably substantially the length the elongated electrode 14.

Figure 2B:
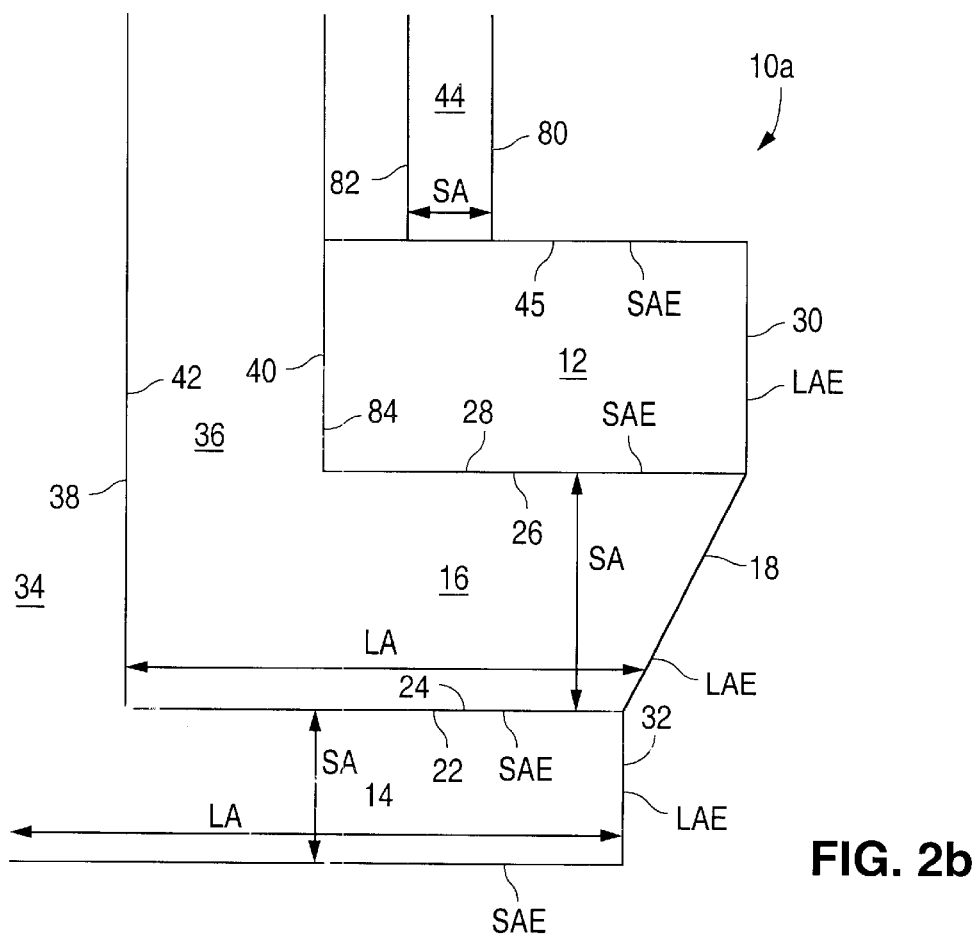

FIG. 2b schematically shows an enlarged view of one unit 10a of the sliding surface preionization arrangement of FIG. 2a. Each of the elongated insulating dielectric 16 and the elongated electrode 14 is defined to have a "short axis" SA dimension and a "long axis" LA dimension. Some surfaces of the elongated dielectric 16, the elongated electrode 14 and the electrode 12 are defined and indicated in FIG. 2b as being either long axis ends LAEs or short axis ends SAEs of the dielectric 16 and the elongated electrode 14. The long axis ends are also referred to herein as "top" and/or "bottom" surfaces, while the short axis surfaces are also referred to herein as "side" surfaces. The use of the terms top and bottom to refer to short axis surfaces is not intended to necessarily refer to any particular relative positioning of the top and bottom surfaces with respect to gravity.

As shown in FIG. 2b, the elongated electrode 14 has a surface 22 at a short axis end that is contacting a similarly contoured surface 24 at a short axis end of the dielectric 18. Preferably each of the surfaces 22 and 24 is substantially planar in contour. The dielectric 18 has another surface 26 at the short axis end opposite the surface 24. The surface 26 at the short axis end of the dielectric 18 is in contact with a surface 28 at a short axis end of the electrode 12. Preferably, each of the surfaces 26 and 28 is substantially planar in contour. One or more of the surfaces 22, 24, 26 and 28 may be otherwise contoured within the spirit and scope of the invention. In addition, the surfaces 22 and 24, as well as the surfaces 26 and 28, may or may not be in contact substantially entirely along their extent, as shown. For example, one or both surfaces 22 and/or 24 (the same goes for surfaces 26 and 28) may have a curved, irregular or discontinuous contour.

The dielectric 16 shown in FIG. 2b has a surface 18 at a long axis end that faces the discharge volume when the preionization unit is in place within the discharge chamber of an excimer or molecular fluorine laser. The surface 18 is advantageously tilted, or angled, or otherwise offset from orthogonal to the preferably planar surfaces 22, 24, 26 and 28. The angle of the surface 18 is selected such that a preionization sliding surface discharge generated along the surface 18 between the electrodes 12 and 14 illuminates the discharge volume centrally and uniformly.

Referring back to FIG. 2a, the preionization unit of the first embodiment including the electrodes 12 and 14 and the dielectric 16 may be positioned closer to the main electrode 8a than the main electrode 8b, while still illuminating the discharge volume centrally with respect to electrodes 8a and 8b, due to the offset from orthogonal with the surfaces 22, 24, 26 and 28 or the tilted or angled nature of the surface 18. A normal to the surface 18 is preferably directed at or near the center of the discharge volume.

The surface 22 preferably contacts the surface 24 up to where a short axis end of the surface 18 begins. The surface 28 preferably contacts the surface 26 up to where the other short axis end of the surface 18 begins. Thus, the dielectric 16 of FIGS. 2a and 2b is exposed only at the surface 18, and portions of the surface 26 not contacting surfaces 28 of electrodes 12. The surface 30 of the electrode 12 is thus spaced closer to the discharge volume than the surface 32 of the electrode 14. Preferably, the surfaces 30 and 32 are parallel and offset from coplanar due to the offset or tilted nature of the surface 18.

Each of the elongated electrode 14 and the elongated dielectric 36 preferably has an extension 34 and 36, respectively, from their long axis ends opposite the surfaces 32 and 18 at their other long axis ends nearer the discharge volume. Alternatively, one or both of the extensions 34 and 36 protrude from a location somewhere inside or between the long axis ends of the portions of the electrode 14 and dielectric 16 that respectively include the surfaces 32 and 18. The extensions 34 and 36 preferably include surfaces 38 and 40, respectively, protruding at an angle, the angles preferably being at or near right angles, from the portions of the electrode 14 and dielectric 16 that include the surfaces 32 and 18. The extension 36 preferably also includes a surface 42 opposite the surface 40. The surface 42 is preferably in contact with the surface 38.

The extension 34 preferably attaches with the frame of the discharge chamber such that the electrode is mechanically stabilized with the frame and electrically grounded, and/or connected with the electrode 8b, and/or maintained at low potential when the electrodes 12 are charged to higher potentials, wherein the potential differences is responsible for the preionization discharge. The dielectric 16 is preferably mechanically supported between the electrode 14 and the electrodes 12, and is mechanically supported against gravity by the electrode 14, although an attachment to the electrodes 12 may further support the dielectric 16. The electrodes 12 also have extensions 44 that connect to high voltage HV via a feedthrough 9 positioned at the frame preferably on the same side of the frame and near where the electrode 14 attaches to the frame, as illustrated at FIG. 2a. The extension 44 preferably protrudes from the surface 45 at the opposite short axis end of the electrode 12 from the surface 28.

Figure 1A:
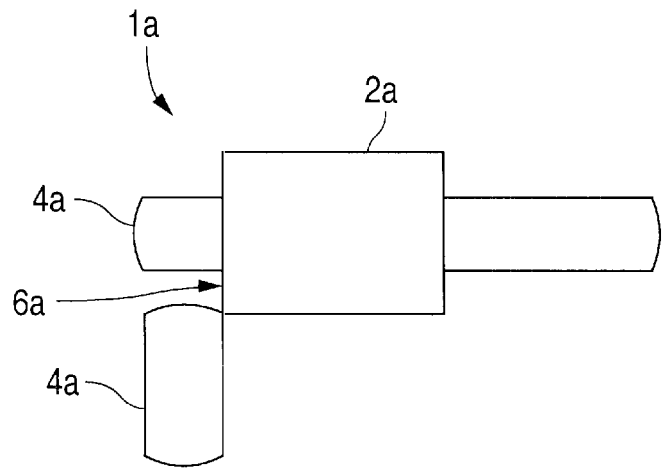
FIGS. 1a and 1b illustrate conventional pin electrode sliding surface preionization arrangements.
Figure 1B:
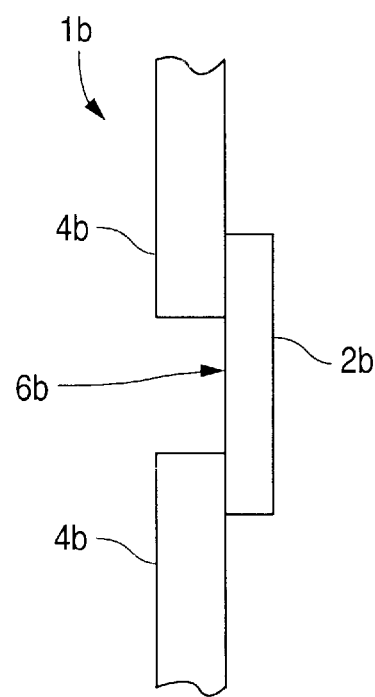

A discharge is formed between the electrodes 12 and 14 that are situated on the opposing short axis surfaces 24 and 26 of the dielectric. In the arrangement of FIG. 1, these interfacing or contacting surface areas are preferably large, e.g., they are preferably larger than the sliding discharge surface 18, resulting in a large capacitance, e.g., 0.1 pF or more. A preferred material for the dielectric 16 has a very large dielectric constant for further providing high capacitance. Voltage pulses applied to the electrodes 12, 14 lead, due to the large capacitance between the electrodes 12, 14, to the development of larger voltage and electric field gradients. Consequently, a preionization "wave", accompanied by luminescence, propagates away from the high voltage electrode 12 enabling disruptive breakdown on the surface of the dielectric.

The sliding surface discharge of the first embodiment as a light source is far better than a free-sparking discharge or a sliding discharge according to the '638 patent. The plasma temperature of the surface discharge is considerably higher than the temperature of conventional preionization arrangements, and the optical yield of the surface discharge is approximately 10 times higher for a same applied voltage HV. Advantageously, a lower voltage HV can be applied to the electrodes 12, 14 for producing a same preionization as a conventional spark-discharge preionization arrangement. The luminescence spectrum also contains more lines due to the nature of the material of the dielectric 16. Additionally, the surface discharge has a larger resistance than the conventional sparking discharge. This considerably simplifies any adjustment procedures that may be desired with the impulse voltage source.

Figure 3A:
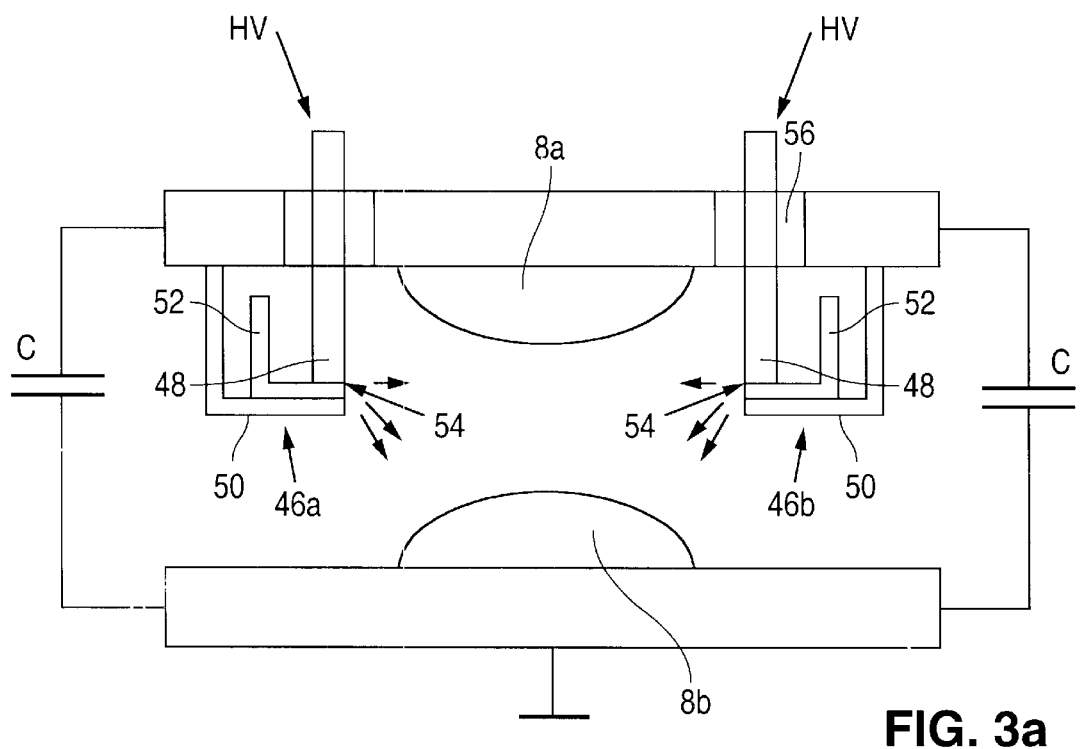
FIG. 3a schematically shows a discharge chamber for an excimer or molecular fluorine laser including a sliding surface preionization arrangement in accord with a second embodiment of the present invention.

FIG. 3a schematically shows a discharge chamber for an excimer or molecular fluorine laser including a sliding surface preionization arrangement in accord with a second embodiment of the present invention. The preionization arrangement includes a pair of sliding surface preionization units 46a, 46b. Alternatively, the laser may have only a single preionization unit 46a or 46b. Each preionization unit 46a, 46b shown in FIG. 3a includes at least one and preferably several high voltage (HV) pin electrodes 48 and an elongated grounded or low voltage electrode 50 separated by an elongated insulating dielectric 52. Preferred dimensions and materials are the same or similar to those set forth above with respect to the first embodiment shown at FIGS. 2a and 2b.

The insulating dielectric 52 includes a sliding surface 54 between each pin electrode 48 and the elongated electrode 50. The dielectric 52 shown in FIG. 3a has an extension 58 similar to that of the first embodiment, except that the surface 60 of the extension 58 is not in contact with the surface 64 of the extension 62 of the electrode 50 (see FIG. 3b).

Electrode 48 is isolated from the metal plate carrying the main electrode 8a by a high voltage feedthrough 56. Each electrode 48 preferably comprises a single simple polyhedron such as a cylinder or rectangular hexahedron, in contrast with the electrodes 12 of the first embodiment shown at FIGS. 2a–2b having the extensions 44 protruding from another portion that includes the surface 30 facing the discharge volume.

Figure 3B:
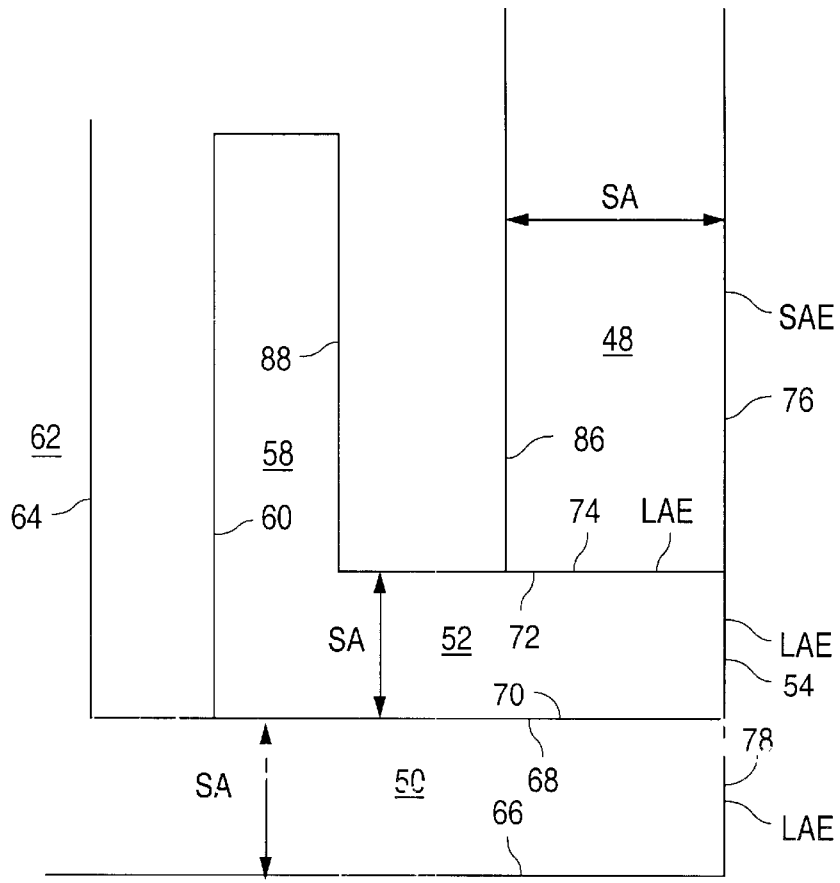

The sliding surface 54 of the dielectric 52 is shown orthogonal to the surfaces 66, 68, 70 and 72 at the short axis ends of the dielectric 52 and electrode 50, including the contact surfaces 68 and 70 (see FIG. 3b). The preionization units 46a and 46b are preferably positioned centrally with respect to the discharge volume, being an equal or nearly equal distance from each of the main electrodes 8a and 8b. The discharge volume is advantageously centrally illuminated by the UV radiation emanating from the preionization surface sliding discharge in this embodiment. Alternatively, the preionization units 46a and 46b may be positioned closer to one main electrode (e.g., 8a) than the other main electrode (i.e., 8b), and the sliding surface 54 tilted or offset from orthogonal to the contact surfaces 68 and 70 (see FIG. 3b) of the electrode 50 and the dielectric 52. In this alternative, the discharge volume is again centrally illuminated because the normal to the sliding discharge surface 54 is again directed at the center of the discharge volume.

FIG. 3b schematically shows an enlarged view of one unit of the sliding surface preionization arrangement of FIG. 3a. The pin electrode 48 shown as a rectangular hexahedron or cylinder or semi-cylinder has a surface 74 at a long axis end that contacts the dielectic 52 at the surface 72 at the short axis end of the dielectric 52. An orthogonal surface 76 at a short axis end of the electrode 48 is preferably coplanar, as shown, with the sliding discharge surface 54, and also with the surface 78 at a long axis end of the electrode 50. The electrode 48 can be thought of as being modified from the electrode 12 of the first embodiment in that, referring back to FIG. 2b, (a) the short axis length of the extension 44 is increased, (b) the surface 80 of the extension 44 facing the discharge volume is brought to coplanar with the surface 30, such that the surfaces 80 and 30 form a single surface (i.e., surface 76 of FIG. 3b), (c) the opposite short axis surface 82 of the extension 44 is brought to coplanar with the surface 84 of the lower portion of the electrode 12 opposite the surface 30, such that the surfaces 82 and 84 form a single surface (i.e., surface 86 of FIG. 3b), and (d) the surfaces 84 and 40 (corresponding to surfaces 86 and 88 of FIG. 3b) are displaced from and not contacting each other.

The area of the surfaces 72 and 74 that are in contact and the area of the surfaces 68 and 70 that are in contact are each preferably greater than the area of the sliding surface 54, permitting high capacitive coupling. The same relationship is preferred for corresponding surfaces of each of the first and third embodiments of FIGS. 2a–2b and 4a–4b, respectively.

Figure 4A:
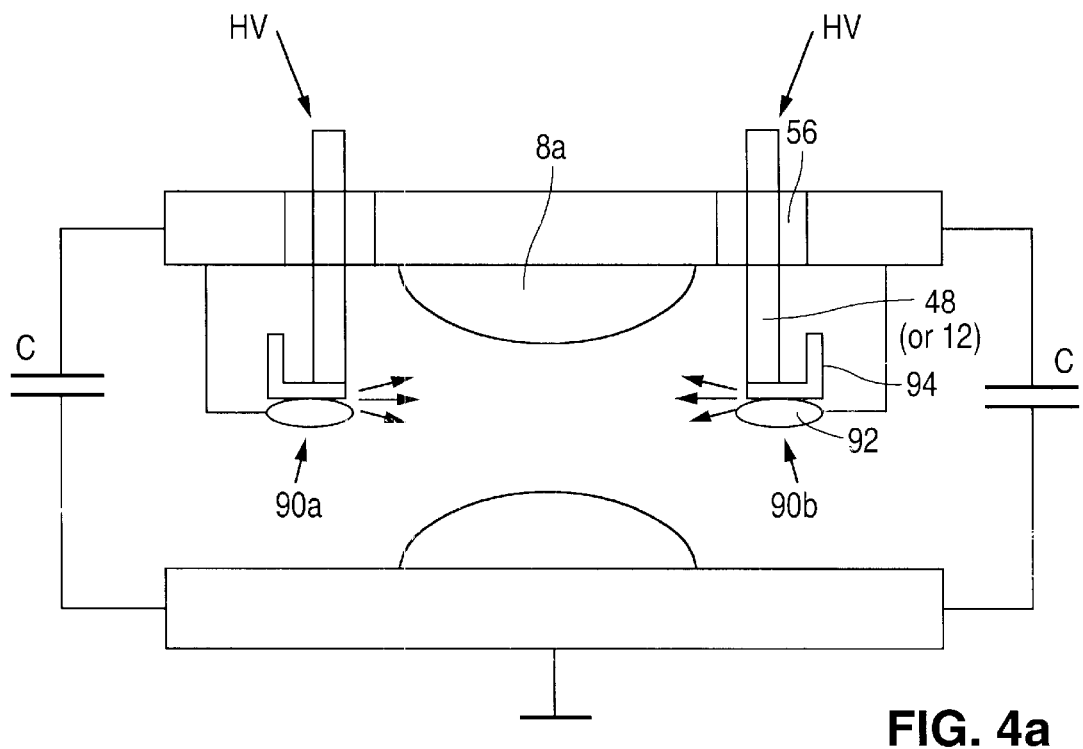
FIG. 4a schematically shows a discharge chamber for an excimer or molecular fluorine laser including a sliding surface preionization arrangement in accord with a third embodiment of the present invention.

FIG. 4a schematically shows a discharge chamber for an excimer or molecular fluorine laser including a sliding surface preionization arrangement in accord with a third embodiment of the present invention. The preionization units 90a and 90b are preferably the same as the preionization units 46a and 46b of the second embodiment, except the shapes of the elongated electrodes 50 and 92 differ, and the size of the elongated dielectrics 52, 94 may also differ due to being supported by the different electrodes 50 and 92. In addition, the electrodes 48 may be replaced with the electrodes 12 of the first embodiment.

Figure 4B:
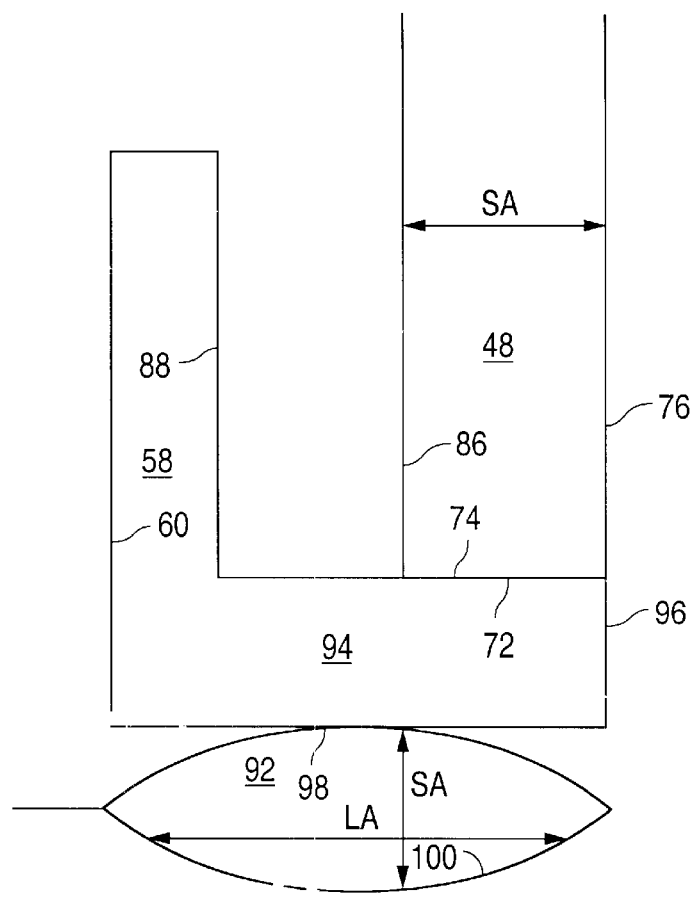

FIG. 4b schematically shows an enlarged view of one unit 90a of the sliding surface preionization arrangement of FIG. 4a. As seen, the relationship between the electrode 48 and the dielectric 94 is preferably the same as that of FIG. 3b, wherein the sliding surface 96 is coplanar with the short axis surface 76 of the electrode 48, and the surfaces 72 and 74 are preferably in planar contact, as in FIG. 3b. Also, the surface 88 of the extension 58 is spaced from the surface 86 of the electrode 48 (this would not be the case if the electrode 48 were repalced by the electrode 12, which is an alternative to the third embodiment).

The elongated electrode 92 shown in FIG. 4b has one or both short axis surfaces 98, 100 curved at long axis ends of the electrode 92. The electrode 92 contacts the dielectric 94 preferably at a planar portion of the surface 98. The electrode 92 may have any of a variety of shapes, all of which have some curvature on one or both surfaces 98, 100 at short axis ends of the electrode 92. For example, the surface 100 could be oppositely curved or planar, and the surface 98 could have a trapezoidal cross-sectional shape or a folded biplanar shape that folds away from the dielectric 94 preferably at the long axis end nearest the discharge volume. The electrode 92 also preferably does not contact the surface 60 of the extension 58 of the dielectric 94, as it does in the first embodiment.

The functioning of the preionization arrangement of the first embodiment wil now be briefly discussed, although any of the embodiments could be used as exemplary structures for performing this preionization function. While the capacitors C are being charged prior to application of a voltage pulse at the main electrodes 8a and 8b, a voltage pulse is formed at pin electrodes 12. The dimensional extent of the sliding surface discharge in the elongated direction of the dielectric 16 depends directly on the extent of the pin electrode 12 in the elongated direction.

Corona and sliding surface pre-ionization discharges each occur during the charging peroid of the capacitors C. The corona and sliding discharge preionizations occur in two stages. First, the corona discharge takes place at electrode 12 at relatively low voltage or weak current compared with the sliding surface and main discharges. Then, as the voltage is further increased, the sliding discharge takes place as a higher current is passed due to the higher applied voltage. The sliding preionization discharge has a higher efficiency than the corona discharge. The sliding discharge serves to improve initial parameters used particularly in high-powered lasers.

The gas medium between the main electrodes 8a and 8b is ionized by the corona and sliding surface preionization discharges and the discharge occurs at the main electrodes when the breakdown voltage is reached. The pre-ionization discharge on the sliding surface 18 of the dielectric 16 is not a single point discharge but occurs throughout the length and width of the electrode 12. In this regard, the spatial extent of the influence on the preionization by each pin electrode 12 is improved in the present invention over conventional spark discharge preionizers. The homogeneity of the preionization is also improved (i.e., higher), and wear of the preionization electrodes is reduced compared to conventional preionization discharges for high powered lasers.

Some Advantages of the Invention (1) A surface discharge preionization arrangement for an excimer or molecular fluorine laser in accord with the present invention has been disclosed wherein the sliding discharge runs along the dielectric surface such that the preionization discharge takes place substantially or completely at that surface portion of the dielectric that is directed towards the main discharge volume.

(2) A surface discharge preionization arrangement for an excimer or molecular fluorine laser advantageously designed such that the dielectric sliding discharge surface is formed, aligned, shaped, tilted, directed, etc., preferably in conjunction with the placement of the preionization arrangement relative to the main electrodes, has been disclosed, wherein directional characteristics of the UV emission of the preionization discharge illuminates substantially only the main discharge volume, preferably at its center.

(3) A surface discharge preionization arrangement in accord with the present invention has been disclosed wherein a dielectric between a pair of electrodes wherein the capacitive coupling is greater than 0.1 pF such that high voltage and electric field gradients are produced at the high voltage preionization electrode.

(4) A surface discharge preionization arrangement has been disclosed wherein specific ceramic materials and sapphire have been selected as preferred such that the dielectric characteristically provides a versatile and efficient preionization spectrum.

(5) A surface discharge preionization arrangement has been disclosed wherein an area discharge greater than two square millimeters per electrode pair is produced. This increases the homogeneity of the pre-ionization and reduces the wear on the pre-ionization electrodes.

(6) A surface discharge preionization arrangement has been disclosed wherein the dielectric has been designed such that pulse energy fluctuations is minimized, particularly by material selection and the design for coupling with the electrodes.

(7) A surface discharge preionization arrangement has been disclosed wherein the output energy of the laser over a predetermined voltage range has been optimized due to enhanced preionization.

All of the references incorporated by reference in the background above are incorporated into the preferred embodiment as describing alternative equivalent elements of the invention. Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. The scope of the invention is thus not limited by the particular embodiments described above. Instead, the scope of the present invention is understood to be encompassed by the language of the claims that follow, and structural and functional equivalents thereof.

What is claimed is:

1. An excimer or molecular fluorine laser, comprising:
   a discharge chamber filled with a laser gas;
   a pair of main electrodes separated by a discharge volume;
   at least one sliding surface preionization unit within the discharge chamber;
   a discharge circuit connected to said pair of main electrodes and said sliding surface preionization unit for energizing the laser gas; and
   a resonator for generating a laser beam,
   wherein said sliding surface preionization unit includes an elongated preionization electrode spaced from one or more associated preionization electrodes by an elongated dielectric, and
   wherein the dielectric includes a sliding discharge surface having a first surface area substantially smaller than a second surface area of a second surface of the dielectric, the second surface contacting the elongated preionization electrode, the sliding discharge surface substantially facing The discharge volume of the laser.

2. The laser of claim 1, wherein said elongated preionization electrode and said one or more associated preionization electrodes contact opposed surfaces of the dielectric, the one or more associated preionization electrodes contacting a third surface of the dielectric opposite the second surface, forming a capacitive assembly.

3. The laser of claim 2, wherein the elongated preionization electrode contacts the dielectric at a fist surface of the elongated preionization electrode having a third surface area substantially smaller than a fourth surface area of a second surface of the elongated preionization electrode.

4. The laser of claim 2, wherein each of the one or more associated preionization electrodes contacts the third surface of the dielectric at a first surface of the associated preionization electrode having a fifth surface area substantially smaller than a sixth surface area of a second surface of the associated preionization electrode.

5. The laser of any of claims 2–4, wherein the elongated preionization electrode contacts the dielectric at a fist surface of the elongated preionization electrode having a third surface area, and wherein the surface area of the first surface of the elongated preionization electrode is larger than the first surface area of the sliding surface.

6. The laser of any of claims 2–4, wherein the elongated preionization electrode. contacts the dielectric at a first surface of the elongated preionization electrode having at third surface area, and wherein each of the one or more associated preionization electrodes contacts the third surface of the dielectric at a first surface of the associated preionization electrode having a fifth surface area, and wherein the the surface area and the fifth surface area, respectively, of the first surface of the elongated preionization electrode and of the first surface of the associated preionization electrodes are each larger than the first surface area of the sliding surface.

7. The laser of claim 1, wherein the elongated preionization electrode contacts the dielectric at a first surface of the elongated preionization electrode having a the surface area, and wherein each of the one or more associated preionization electrodes contacts the third surface of the dielectric at a first surface of the associated preionization electrode having a fifth ace area, and wherein the third surface area and the fifth surface area, respectively, of the first surface of the elongated preionization electrode and of the first surface of the associated preionization electrodes are each larger than the first surface area of the sliding surface.

8. The laser of claim 1, wherein the elongated preionization electrode contacts the dielectric at a first surface of the elongated preionization electrode having a third surface area, and wherein the third surface area area of the first surface of the elongated peionization electrode is larger than the first surface area of the sliding surface.

9. The laser of claim 1, wherein the sliding surface is positioned at a substantially central location with respect to the height of the discharge volume.

10. The laser of claim 1, wherein the sliding surface is positioned closer to one main electrode than the other main electrode.

11. The laser of any of claims 9 or 10, wherein the normal to the sliding surface is directed at a substantially central location with respect to the height of the discharge volume.

12. The laser of claim 1, wherein the insulating dielectric includes a first portion having the sling surface at a first end and a second portion extending at an angle to a normal to the sliding surface.

13. The laser of claim 12, wherein the second portion extends from a second end of the first portion opposite the first end of the fiat portion.

14. The laser of any of claims 12 or 13, wherein the angle is substantially a right angle.

15. The laser of claim 1, where each of the one or more associated preionization electrodes contacts a third surface of the dielectric opposite the second surface, and wherein at least one of the second and third surfaces of the dielectric is substantially planar and the space of the preionization electrode that contacts the substantially planar surface of the dielectric is also substantially planar and contacting the substantially planar dielectric surface over an area that is larger than the first surface area of the sliding surface.

16. The laser of claim 1, where each of the one or more associated preionization electrodes contacts a third surface of the dielectric opposite the second surface, and wherein each of the second and gird surfaces of the dielectric is substantially planar and the surface of one of the preionization electrodes that contacts the dielectric is also substantially planar and contacting one of the substantially planar dielectric surfaces over an area that is larger than the first surface area of the sliding surface.

17. The laser of any of claims 15 or 16, wherein the surface of the other one of the preionization electrodes that contacts the other of the second and third surfaces of the dielectric has at least one curved portion.

18. The laser of any of claims 15 or 16, wherein the surface of the other one of the preionization electrodes that contacts the other of the second and third surfaces of the dielectric has a portion that slopes away from the dielectric toward the discharge volume.

19. The laser of claim 1, wherein the areas of the sliding surfaces corresponding to each of the associated preionization electrodes is at least two square millimeters.

20. The laser of claim 1, wherein the capacitive coupling between the preionization electrodes is greater than 0.1 pF.

21. The laser of claim 1, wherein the dielectric comprises a material selected from the group of materials consisting of $Al_2O_3$, $BaTiO_3$, $BaTiO_3/SrTiO_3$, $BaTiO_3/ZrO_2$ and $ZrO_2$.

22. The laser of claim 1, wherein the dielectric comprises sapphire.

23. The laser of claim 1, wherein the active species within the laser gas is one of $F_2$, ArF, KrF, KrCl, XeF and XeCl.

24. An excimer or molecular fluorine laser, comprising:
a discharge chamber filled with a laser gas;
a pair of main electrodes separated by a discharge volume;
at least one sliding surface preionization unit wit he discharge chamber;
a discharge circuit connected to said pair of main electrodes and said sliding surface preionization unit for energizing the laser gas; and
a resonator for generating a laser beam,
wherein said sliding surface preionization unit includes an elongated preionization electrode spaced from one or more associated preionization electrodes by a dielectric, and
wherein the dielectric includes a sliding discharge surface having a first surface area substantially smaller Om a second surface area of a second surface of the dielectric, the second surface contacting the elongated preionization electrode, the sliding surface substantially facing the discharge volume of the laser, and
wherein the sliding surface is positioned at a substantially central location with respect to the height of the discharge volume.

25. An excimer or molecular fluorine laser, comprising:
a discharge chamber filled with a laser gas;
a pair of main electrodes separated by a discharge volume;
at least one sliding surface preionization unit within the discharge chamber and not located inside of either of the pair of main electrodes;
a discharge circuit connected to said paw of main electrodes and said sliding surface preionization unit for energizing the laser gas; and
a resonator for generating a laser beam,
wherein said sliding surface preionization unit includes an elongated preionization electrode spaced from one or more associated preionization electrodes by a dielectric, and
wherein the dielectric includes a sliding discharge surface substantially facing the discharge volume of the laser, and
wherein the sliding surface is positioned closer to one main electrode than the or the main electrode, and
wherein the normal to the sliding surface is directed at a substantially central location with respect to the height of the discharge volume.

26. The laser of claim 25, wherein a first surface area of tie sliding surface is substantially smaller than a second surface area of the second surface of said dielectric.

27. The laser of any of claims 24–26, wherein the areas of the sliding surfaces corresponding to each of the associated preionization electrodes is at least two square millimeters.

28. The laser of any of claims 24–26, wherein the capacitive coupling between the preionization electrodes is greater than 0.1 pF.

29. The laser of any of claims 24–26, wherein the dielectric comprises a material selected from the group of materials consisting of $Al_2O_3$, $BaTiO_3$, $BaTiO_3/SrTiO_3$, $BaTiO_3/ZrO_2$ and $ZrO_2$.

30. The laser of any of claims 24–26, wherein the dielectric comprises sapphire.

31. The laser of any of claims 24–26, wherein the active species within the laser gas is one of $F_2$, ArF, KrF, KrCl, XeF and XeCl.

32. An excimer or molecular fluorine laser, comprising:
a chamber filled with a lasing gas;
a pair of opposed main electrodes extending longitudinally within the chamber and connected to a discharge circuit;
at least one sliding surface preionization unit connected to the discharge circuit for generating a preionization discharge and including:
an elongated primary electrode extending along the longitudinal axis of the chamber and spaced from the main electrodes;
an elongated dielectric member mounted on the upper surface of the primary electrode, said dielectric member having a side face directed towards the discharge volume between the main electrodes; and
a plurality of secondary electrodes mounted to the top surface of the dielectric member with said primary and secondary electrodes and said dielectric member being configured such that the preionization discharge is generated primarily at the side face of the dielectric member and directed to the discharge volume between said main electrodes.

33. The laser of claim 32, wherein the contact area of the primary electrode with the dielectric member is larger than the area of the side face of the dielectric member between the primary and secondary electrodes.

34. The laser of claim 32, wherein the contact areas of the primary and secondary electrodes with the dielectric member are each larger than the area of the side face of the dielectric member between the primary and secondary electrodes.

35. The laser of claim 32, wherein the side face of the dielectric member is positioned at a substantially central location with respect to the height of the discharge volume between the main electrodes.

36. The laser of claim 32, wherein the side face of the dielectric member is positioned closer to one main electrode than the other main electrode.

37. The laser of any of claims 35 or 36, wherein the normal to the side face is directed at a substantially central location with respect to the height of the discharge volume between the main electrodes.

38. The laser of claim 32, wherein the insulating dielectric includes a first portion including the side face at one end and a second portion extending at an angle to the first portion.

39. The laser of claim 38, wherein the second portion extends from the other end opposite the end including the side face.

40. The laser of any of claims 38 or 39, wherein the angle is substantially a right angle.

41. The laser of claim 32, wherein at least one of the surfaces of the dielectric member contacting the primary and second electrodes is substantially planar and the surface of the electrode that contacts the substantially planar surface of the dielectric member is also substantially planar and contacting the substantially planar surface of the dielectric member over an area that is larger than the area of the side face between the primary and secondary electrodes.

42. The laser of claim 32, wherein each of the surfaces of the dielectric member contacting the primary and secondary electrodes is substantially planar and the surface of one of the primary and secondary electrodes that contacts the dielectric is also substantially planar and contacting one of the substantially planar surfaces of the dielectric member over an area that is larger than the area of the side face between the primary and secondary electrodes.

43. The laser of any of claims 41 or 42, wherein the surface of the other one of the primary and secondary electrodes that contacts the other surface of the dielectric member has at least one curved portion.

44. The laser of any of claims 41 or 42, wherein the surface of the other one of the primary and secondary electrodes that contacts the other surface of the dielectric member has a portion that slopes away from the dielectric member towards the discharge volume.

45. The laser of claim 32, wherein the areas of the side face between the primary and each of the secondary electrodes is at least two square millimeters.

46. The laser of claim 32, wherein the capacitive coupling between the primary and secondary electrodes is at least 0.1 pF.

47. The laser of claim 32, wherein the dielectric member comprises a material selected from the group of materials consisting of $Al_2O_3$, $BaTiO_3$, $BaTiO_3/SrTiO_3$, $BaTiO_3/ZrO_2$ and $ZrO_2$.

48. The laser of claim 32, wherein the dielectric member comprises sapphire.

49. The laser of claim 32, wherein the active species within the lasing gas is one of $F_2$, ArF, KrF, KrCl, XeF and XeCl.

50. The laser of claim 25, wherein the elongated preionization electrode contact a second surface of the dielectic and the one or more associated preionization electrodes contact a third surface of the dielectric opposite the second surface of the dielectric.

51. An excimer or molecular fluorine laser, comprising;
a discharge chamber filled with a laser gas;
a pair of main electrodes separated by a discharge volume;
at least one sliding surface preionization unit within the discharge chamber;
a discharge circuit connected to said pair of main electrodes and said sliding surface preionization unit for energizing the laser gas; and
a resonator for generating a laser beam,
wherein said sliding surface preionization unit includes an elongated preionization electrode spaced from one or more associated preionization electrodes by a dielectric, and
wherein the dielectric includes a sliding discharge surface substantially facing the discharge volume of the laser, and
wherein the elongated preionization electrode contact a second surface of the dielectric and the one or more associated preionization electrodes contact a third surface of the dielectric opposite the second surface of the dielectric, and
wherein the sliding surface is positioned closer to one main electrode than the other main electrode, and
wherein the normal to the sliding surface is directed at a substantially central location with respect to the height of the discharge volume.

52. The laser of claim 51, wherein a first surface area of the sliding surface is substantially smaller than a second surface area of the second surface of said dielectric.

53. The laser of claim 51, wherein the areas of the sliding surfaces corresponding to each of the associated preionization electrodes is at least two square millimeters.

54. The laser of claim 51, wherein the capacitive coupling between the preionization electrodes is greater than 0.1 pF.

* * * * *